(12) United States Patent
Saiwai et al.

(10) Patent No.: US 9,955,496 B2
(45) Date of Patent: Apr. 24, 2018

(54) MOBILE COMMUNICATION SYSTEM, USER TERMINAL, AND NETWORK APPARATUS

(71) Applicant: KYOCERA CORPORATION, Kyoto (JP)

(72) Inventors: Takahiro Saiwai, Kawasaki (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 121 days.

(21) Appl. No.: 14/903,917

(22) PCT Filed: Jul. 7, 2014

(86) PCT No.: PCT/JP2014/068007
§ 371 (c)(1),
(2) Date: Jan. 8, 2016

(87) PCT Pub. No.: WO2015/005255
PCT Pub. Date: Jan. 15, 2015

(65) Prior Publication Data
US 2016/0150559 A1    May 26, 2016

(30) Foreign Application Priority Data

Jul. 9, 2013  (JP) .................................. 2013-144022

(51) Int. Cl.
*H04W 72/12* (2009.01)
*H04W 72/04* (2009.01)
(Continued)

(52) U.S. Cl.
CPC ....... *H04W 72/1263* (2013.01); *H04W 72/02* (2013.01); *H04W 72/0406* (2013.01); *H04W 72/12* (2013.01); *H04W 92/18* (2013.01)

(58) Field of Classification Search
CPC ......... H04W 72/0263; H04W 72/0406; H04W 92/18
See application file for complete search history.

(56) References Cited

U.S. PATENT DOCUMENTS 8,493,956 B2 * 7/2013 Wu ....................... H04W 74/00
370/348
9,288,793 B2 * 3/2016 Wang ................ H04W 72/0406
(Continued)

FOREIGN PATENT DOCUMENTS

JP      2012-143002 A    7/2012
JP      2013-93867 A     5/2013

OTHER PUBLICATIONS

3GPP TR 22.803, V12.1.0 (Mar. 2013), 3rd Generation Partnership Project; Technical Specification Group Services and System Aspects; Feasibility study for Proximity Services (ProSe), (Release 12), pp. 1-45.
(Continued)

*Primary Examiner* — Rasheed Gidado
(74) *Attorney, Agent, or Firm* — Studebaker & Brackett PC

(57) ABSTRACT

A controller performs a mediation of an assigned radio resource such that the radio resource assigned to each of a plurality of other user terminals does not overlap each other, in a case where a transmission of user data is not performed among each of the plurality of other user terminals through D2D communication, and in a case where each of the plurality of other user terminals assigns the radio resource for transmitting the user data through the D2D communication.

9 Claims, 7 Drawing Sheets

(51) Int. Cl.
*H04W 72/02* (2009.01)
*H04W 92/18* (2009.01)

(56) References Cited

U.S. PATENT DOCUMENTS

| | | | |
|---|---|---|---|
| 9,420,564 B2 * | 8/2016 | Charbit | H04W 72/04 |
| 2006/0229092 A1 * | 10/2006 | Jia | H04W 76/023 |
| | | | 455/517 |
| 2009/0036138 A1 * | 2/2009 | Horn | H04L 47/70 |
| | | | 455/450 |
| 2013/0109301 A1 * | 5/2013 | Hakola | H04W 76/023 |
| | | | 455/39 |
| 2015/0271656 A1 * | 9/2015 | Sachs | H04W 8/005 |
| | | | 370/329 |

OTHER PUBLICATIONS

International Search Report and Written Opinion of PCT/JP2014/068007 dated Aug. 5, 2014.

\* cited by examiner

MOBILE COMMUNICATION SYSTEM, USER TERMINAL, AND NETWORK APPARATUS

TECHNICAL FIELD

The present invention relates to a mobile communication system, a user terminal, and a network apparatus that support D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In D2D communication, a plurality of proximal user terminals perform direct device-to-device communication without passing through a network. On the other hand, in cellular communication which is normal communication in a mobile communication system, a user terminal performs communication via a network.

Further, it is assumed that scheduling for assigning a radio resource used for transmitting and receiving user data in D2D communication includes a case where a user terminal performing the D2D communication takes an initiative to perform the scheduling as well as a case where a base station included in a network takes an initiative to perform the scheduling. As a result of the user terminal performing the D2D communication assigning the radio resource by the user terminal itself, it is possible to reduce a load of the base station.

PRIOR ART DOCUMENT

Non-Patent Document

Non Patent Document 1: 3GPP technical report "TR 22.803 V12.1.0" March, 2013

SUMMARY OF THE INVENTION

It is assumed that a case, where one user terminal performs D2D communication with a plurality of other user terminals as a partner, includes not only a case where all members in a group configured by a user terminal and the plurality of other user terminals perform D2D communication, but also a case where the user terminal performs D2D communication with each of the plurality of other user terminals individually, in other words, a case where user data is not transmitted in D2D communication among each of the plurality of other user terminals.

In the latter case, when each of the plurality of other user terminals, rather the user terminal, performs the scheduling of a radio resource to be assigned to itself and to the user terminal for transmitting the user data, each of the plurality of other user terminals does not know the situation of the radio resource assigned by (the plurality of) the other user terminals other than itself, and therefore, each of the plurality of other user terminals may assign the same radio resource each other. When each of the plurality of other user terminals performs D2D communication by using the same radio resource each other, an interference may occur.

Therefore, an object of the present invention is to provide a mobile communication system, a user terminal, and a network apparatus, with which it is possible to suppress occurrence of interference even though each of a plurality of other user terminals performs scheduling for assigning a radio resource to itself and to a user terminal when the user terminal performs D2D communication with each of the plurality of other user terminals individually.

According to an embodiment, a mobile communication system supports D2D communication that is direct device-to-device communication without passing through a network. The mobile communication system comprises: a user terminal; a plurality of other user terminals that perform the D2D communication with the user terminal; and a controller configured to control a radio resource which is assigned to transmit user data through the D2D communication. The controller performs a mediation of an assigned radio resource such that the radio resource assigned to each of the plurality of other user terminals does not overlap each other, in a case where a transmission of the user data is not performed among each of the plurality of other user terminals through the D2D communication, and in a case where each of the plurality of other user terminals assigns the radio resource for transmitting the user data through the D2D communication.

According to a mobile communication system, a user terminal, and a network apparatus according to the present invention, it is possible to suppress occurrence of interference even though each of a plurality of other user terminals performs scheduling for assigning a radio resource to itself and to a user terminal when the user terminal performs D2D communication with each of the plurality of other user terminals individually.

DESCRIPTION OF THE EMBODIMENT

Figure 1:
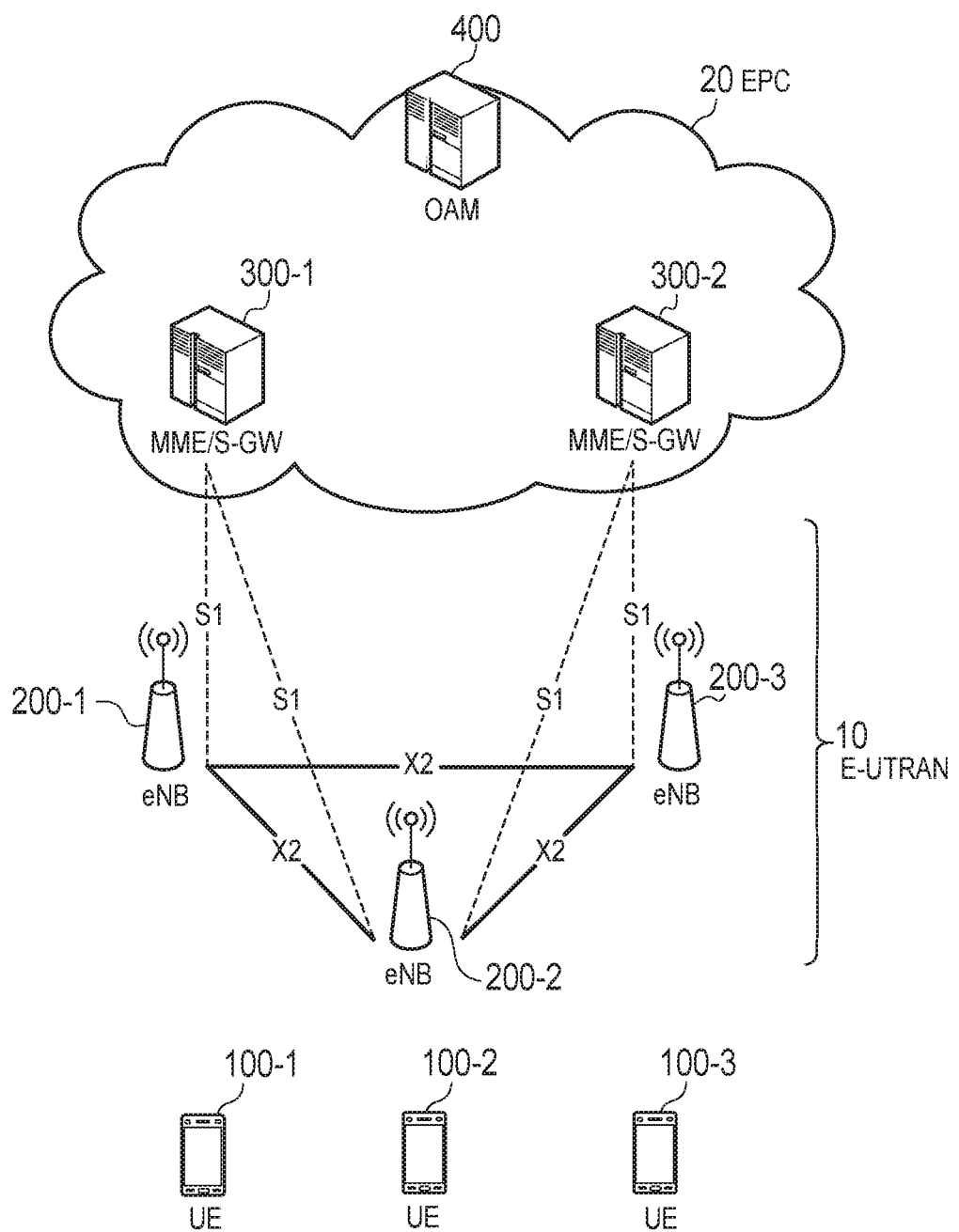
FIG. 1 is a configuration diagram of an LTE system.

A mobile communication system according to a present invention is a mobile communication system supporting D2D communication that is direct device-to-device communication without passing through a network. The mobile communication system comprises: a user terminal; a plurality of other user terminals that perform the D2D communication with the user terminal; and a controller configured to control a radio resource which is assigned to transmit user data through the D2D communication. The controller performs a mediation of an assigned radio resource such that the radio resource assigned to each of the plurality of other user terminals does not overlap each other, in a case where a transmission of the user data is not performed among each of the plurality of other user terminals through the D2D communication, and in a case where each of the plurality of other user terminals assigns the radio resource for transmitting the user data through the D2D communication.

In the present embodiment, each of the plurality of other user terminals notifies the controller of scheduling information indicating the assigned radio resource. The controller notifies a mediation result (a D2D band assignment response) indicating an acceptance or a rejection to perform the D2D communication by using the assigned radio resource on the basis of the notified scheduling information.

In a first and a second modification of the present embodiment, each of the plurality of other user terminals notifies the controller of scheduling information indicating the assigned radio resource. The controller assigns a new radio resource for the user terminal and each of the plurality of other user terminals on the basis of the notified scheduling information. The controller notifies information indicating the new radio resource.

In a first and a second modification of the present embodiment, the controller is provided in a communication apparatus other than the user terminal, and each of the plurality of other user terminals notifies the user terminal of scheduling information indicating the assigned radio resource. The user terminal transmits, to each of the plurality of other user terminals, information indicating that the communication apparatus performs a mediation of the assigned radio resource.

In the first modification of the present embodiment, the communication apparatus is a network apparatus included in the network. The controller is provided in the network apparatus.

In the second modification of the present embodiment, the communication apparatus is one user terminal out of the plurality of other user terminals. The controller is provided in the one user terminal.

A user terminal according to the present embodiment is a user terminal in a mobile communication system supporting D2D communication that is direct device-to-device communication without passing through a network and comprising a plurality of other user terminals performing D2D communication with the user terminal, and. The user terminal comprises: a controller configured to control a radio resource which is assigned to transmit user data through the D2D communication. The controller performs a mediation of an assigned radio resource such that the radio resource assigned to each of the plurality of other user terminals does not overlap each other, in a case where a transmission of the user data is not performed among each of the plurality of other user terminals through the D2D communication, and in a case where each of the plurality of other user terminals assigns the radio resource for transmitting the user data through the D2D communication.

A network apparatus according to the present embodiment is a network apparatus in a mobile communication system supporting D2D communication that is direct device-to-device communication without passing through a network and comprising a user terminal and a plurality of other user terminals performing D2D communication with the user terminal. The network apparatus comprises: a controller configured to control a radio resource which is assigned to transmit user data through the D2D communication. The controller performs a mediation of an assigned radio resource such that the radio resource assigned to each of the plurality of other user terminals does not overlap each other, in a case where a transmission of the user data is not performed among each of the plurality of other user terminals through the D2D communication, and in a case where each of the plurality of other user terminals assigns the radio resource for transmitting the user data through the D2D communication.

Hereinafter, with reference to the accompanying drawings, the following description will be provided for each embodiment when D2D communication is introduced to a cellular mobile communication system (hereinafter, an "LTE system") configured according to 3GPP standards.

EMBODIMENT

LTE System

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 manages a cell and performs radio communication with the UE 100 which establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a MME (Mobility Management Entity)/S-GW (Serving-Gateway) 300 and an OAM (Operation and Maintenance) 400. Further, the EPC 20 corresponds to a core network.

The MME is a network node for performing various mobility controls for the UE 100, for example, and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server apparatus managed by an operator and performs maintenance and monitoring of the E-UTRAN 10.

Next, the configurations of the UE 100 and the eNB 200 will be described.

Figure 2:
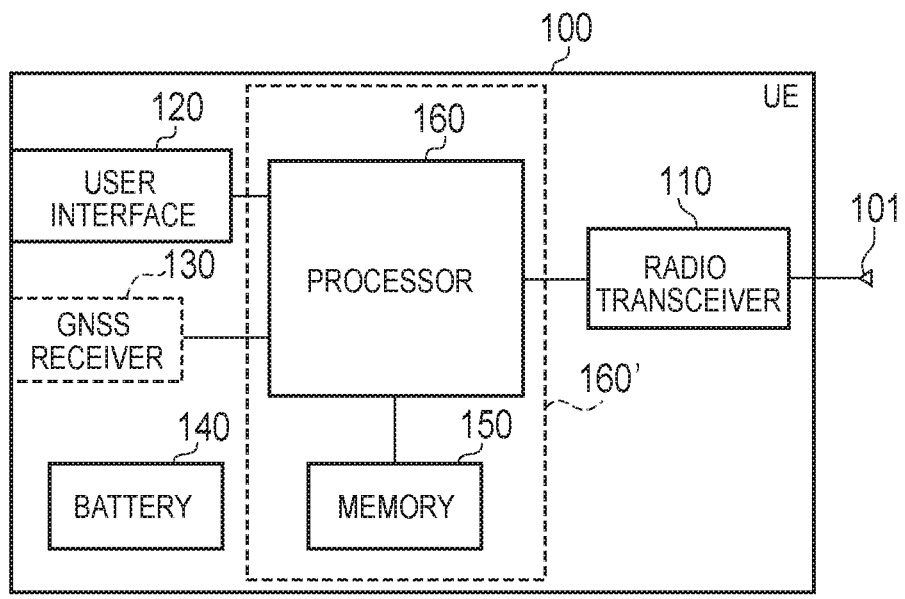
FIG. 2 is a block diagram of a UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

In the present embodiment, the controller controls a radio resource which is assigned to transmit user data through the D2D communication.

Further, the controller performs a mediation of an assigned radio resource such that the radio resource assigned to each of the plurality of the UE 100 does not overlap each other, in a case where the controller assigns the radio resource for transmitting the user data through the D2D communication. In other words, the controller performs an operation for adjusting the assigned radio resource. The mediation will be described in details further below.

The UE 100 may not have the GNSS receiver 130. Furthermore, the memory 150 may be integrally formed with the processor 160, and this set (that is, a chipset) may be called a processor 160' constituting a controller.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

Figure 3:
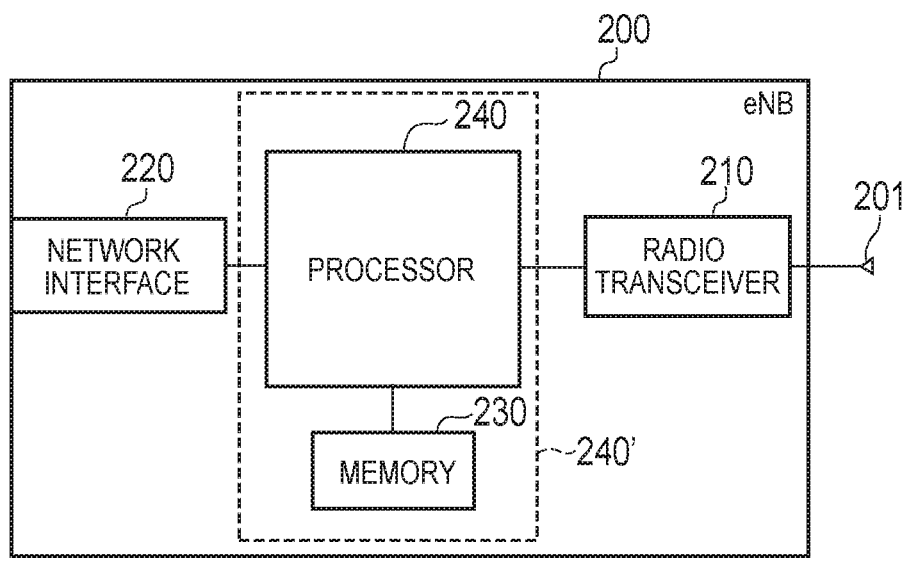
FIG. 3 is a block diagram of an eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller. It is noted that the memory 230 may be integrally formed with the processor 240, and this set (that is, a chipset) may be called a processor 240' constituting a controller.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
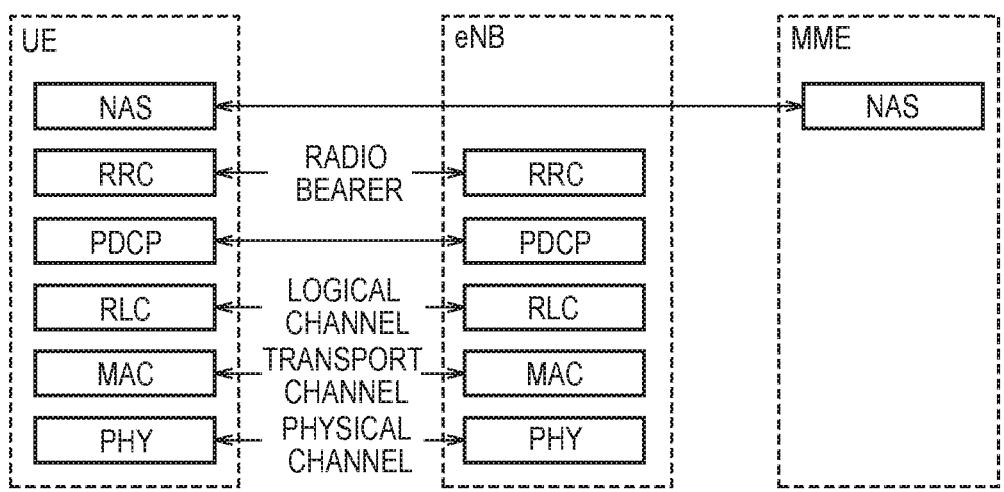
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by use of a physical channel. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state, and when the RRC connection is not established, the UE 100 is in an idle state.

A NAS (Non-Access Stratum) layer positioned above the RRC layer performs session management or mobility management, for example.

Figure 5:
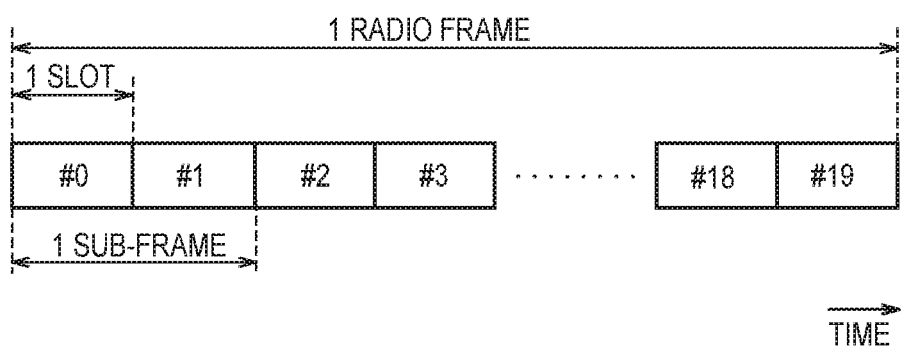
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is used in a downlink, and SC-FDMA (Single Carrier Frequency Division Multiple Access) is used in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Furthermore, cell-specific reference signals (CRSs) are distributed and arranged in each subframe.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH). Furthermore, demodulation reference signal (DMRS) and sounding reference signal are arranged in each subframe.

D2D Communication

An LTE system according to the present embodiment supports D2D communication that is direct device-to-device communication (UE-to-UE communication). Here, the D2D communication is described in comparison with cellular communication that is normal communication of the LTE system. The cellular communication is a communication mode in which a data path passes through a network (E-UTRAN 10, EPC 20). The data path is a communication path for user data. On the other hand, the D2D communication is a communication mode in which a data path set between UEs does not pass through the network.

Figure 6:
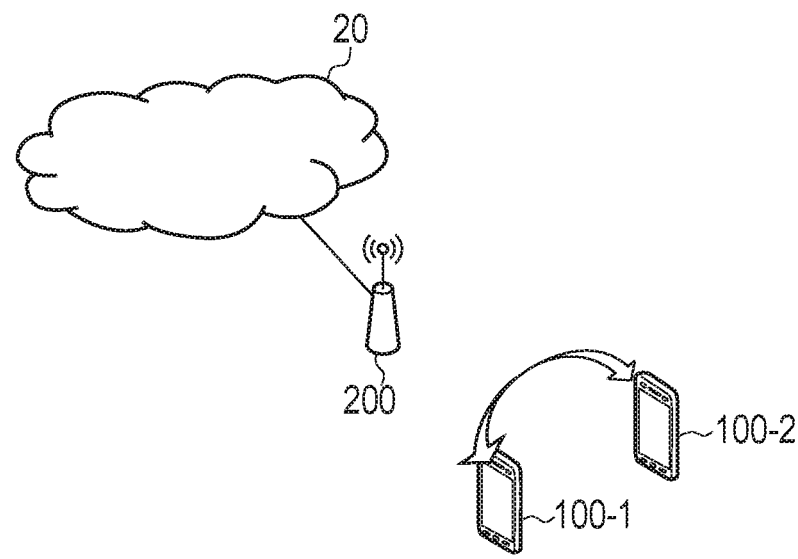
FIG. 6 is a diagram for describing D2D communication.

FIG. 6 is a diagram for describing the D2D communication. As shown in FIG. 6, in the D2D communication, a data path does not pass through the eNB 200. A UE 100-1 and a UE 100-2 proximal to each other directly perform radio communication with low transmission power in a cell of the eNB 200. Thus, when the proximal UE 100-1 and UE 100-2 directly perform radio communication with low transmission power, it is possible to reduce a power consumption of the UE 100 and to reduce interference to a neighboring cell, in comparison with in the cellular communication.

Operation Environment of Mobile Communication System

Figure 7:
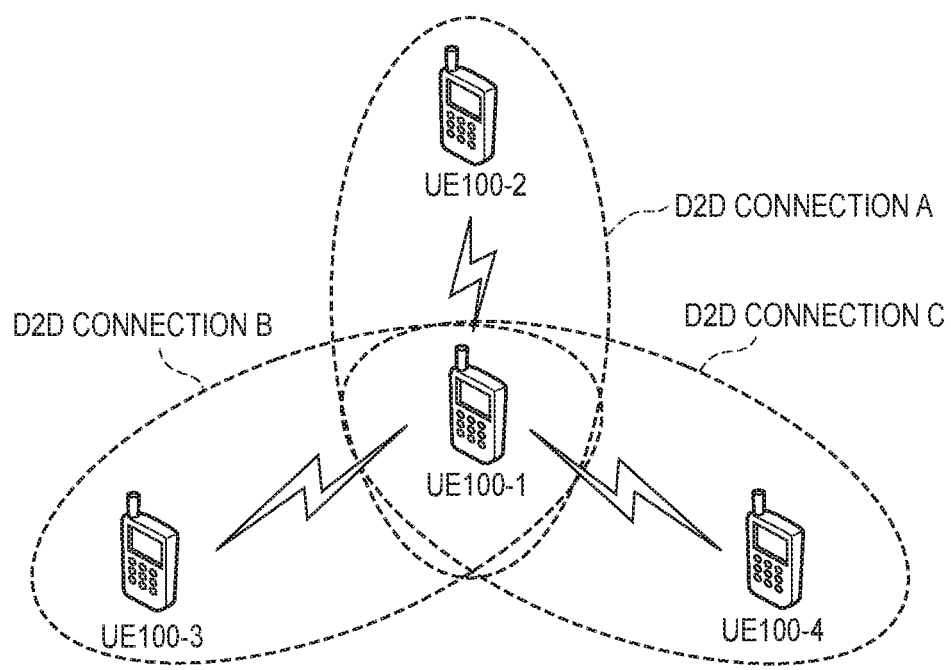
FIG. 7 is an explanatory diagram for describing an operation environment of a mobile communication system according to the present embodiment.

Next, by using FIG. 7, an operation environment of the mobile communication system according to the present embodiment will be described. FIG. 7 is an explanatory diagram for describing the operation environment of the mobile communication system according to the present embodiment.

As shown in FIG. 7, the UE 100-1 performs D2D communication with each of the UE 100-2, a UE 100-3, and a UE 100-4 individually. Therefore, between the UE 100-1 and the UE 100-2, a connection (D2D connection A) is established that is used for transmitting and receiving the user data in D2D communication. Thus, between the UE 100-1 and the UE 100-2, the user data is transmitted and received by using the D2D connection A. Similarly, between the UE 100-1 and the UE 100-3, a D2D connection B is established, and between the UE 100-1 and the UE 100-4, a D2D connection C is established.

On the other hand, the UE 100-2 performs D2D communication with the UE 100-1, however, the UE 100-2 does not perform D2D communication with each of the UE 100-3 and the UE 100-4. Therefore, between the UE 100-2 and the UE 100-3, and between the UE 100-2 and the UE 100-3, a connection used for transmitting and receiving the user data in D2D communication is not established. Similarly, between the UE 100-3 and the UE 100-4, a connection used for transmitting and receiving the user data in D2D communication is not established.

Schematic Operation of Mobile Communication System

Figure 8:
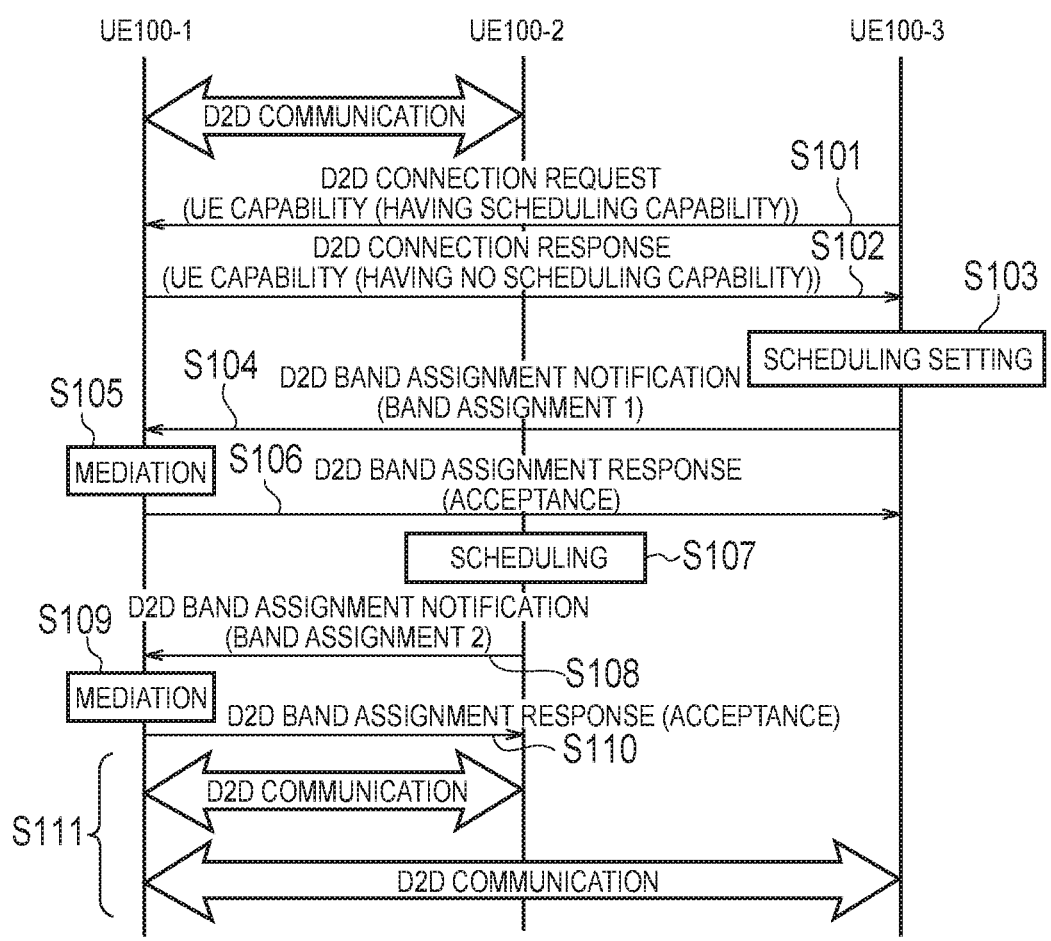
FIG. 8 is a sequence diagram illustrating an operation example of the mobile communication system according to the present embodiment.

Next, a schematic operation of a mobile communication system according to the present embodiment will be described by using FIG. 8. FIG. 8 is a sequence diagram illustrating an operation example of the mobile communication system according to the present embodiment.

Hereinafter, a description will be given on the assumption that the UE 100-1 performs D2D communication with each of the UE 100-2 and the UE 100-4 individually, and the UE 100-3 has not started D2D communication with the UE 100-1. It is noted that a description about the UE 100-4 will be omitted because the operation of the UE 100-4 is similar to the operation of the UE 100-2.

Further, in the present embodiment, a description will be given on the assumption that the UE 100-1 does not have the capability to assign a radio resource to each of the UEs 100 for D2D communication (hereinafter, called as a scheduling capability).

As shown in FIG. 8, in step S101, the UE 100-3 transmits a D2D connection request to the UE 100-1. The UE 100-1 receives the D2D connection request from the UE 100-3.

The D2D connection request is used to request an establishment of a device-to-device connection to perform D2D communication. In the present embodiment, the D2D connection request includes information indicating that the UE 100-3 has the scheduling capability (UE Capability).

In step S102, the UE 100-1 transmits, to the UE 100-3, a response to the D2D connection request (D2D connection response). The UE 100-3 receives the D2D connection response. In the present embodiment, the D2D connection response includes information indicating that the UE 100-1 does not have the scheduling capability (UE Capability).

In step S103, the UE 100-3 performs a scheduling setting to perform an assignment of a radio resource used in D2D communication with the UE 100-1. The UE 100-3, that has received the D2D connection response, determines that the UE 100-1 is not capable of performing the scheduling, and performs the scheduling setting. The UE 100-3, that performs the scheduling setting, then assigns a radio resource to each of the UE 100-1 and the UE 100-3.

In step S104, the UE 100-3 transmits a D2D band assignment notification to the UE 100-1. The UE 100-1 receives the D2D band assignment notification.

The D2D band assignment notification is used for notifying a radio resource assigned for D2D communication by the scheduling. In the present embodiment, a band assignment 1 that is assigned to the UE 100-1 and the UE 100-3 is notified by the D2D band assignment notification. The band assignment 1 includes not only the radio resource assigned to the UE 100-1 for performing transmission but also the radio resource assigned to the UE 100-3 for performing transmission (that is, to the UE 100-1 for performing reception). The same is true of band assignments that described later.

In step S105, the UE 100-1 performs the mediation of the radio resource. Specifically, the UE 100-1 determines whether the band assignment 1 does not overlap with a radio resource assigned to each of the UE 100-1 and the UE 100-2 (hereinafter, called as a band assignment 0).

In step S106, the UE 100-1 transmits, to the UE 100-3, a response to the D2D band assignment notification (D2D band assignment response). The UE 100-3 receives the D2D band assignment response.

In a case where the UE 100-1 has determined that the band assignment 1 does not overlap with the band assignment 0 in step S105, the UE 100-1 transmits acceptance information, as the D2D band assignment response, to accept performing D2D communication by using the band assignment 1. On the other hand, in a case where the UE 100-1 has determined that the band assignment 1 overlaps with the band assignment 0 in step S105, the UE 100-1 transmits rejection information, as the D2D band assignment response, to reject performing D2D communication by using the band assignment 1.

In a case where the UE 100-3 has received the rejection information, the UE 100-3 performs the scheduling, and transmits, to the UE 100-1, a new D2D band assignment notification including a different band assignment from the band assignment 1.

In the present embodiment, a description will be given on the assumption that the UE 100-1 has transmitted the acceptance information.

In step S107, the UE 100-2 performs the scheduling. Specifically, the UE 100-2 assigns a radio resource to the each of the UE 100-1 and the UE 100-2.

In step S108, similar to step S104, the UE 100-2 transmits the D2D band assignment notification to the UE 100-1. The UE 100-1 receives the D2D band assignment notification. In the present embodiment, the D2D band assignment notification notifies a band assignment 2 that is assigned to the UE 100-1 and the UE 100-2.

In step S109, similar to step S105, the UE 100-1 performs the mediation of the radio resource. Specifically, the UE 100-1 determines whether the band assignment 2 does not overlap with the band assignment 1.

In steps S110, similar to step S106, the UE 100-1 transmits the response to the D2D band assignment notification (D2D band assignment response) to the UE 100-2. The UE 100-2 receives the D2D band assignment response. A description will be given on the assumption that the UE 100-1 has transmitted the acceptance information.

In step S111, the UE 100-2 that has received the acceptance information performs D2D communication with the UE 100-1 by using the band assignment 2. Further, the UE 100-3 that has received the acceptance information performs D2D communication with the UE 100-1 by using the band assignment 1.

Figure 9:
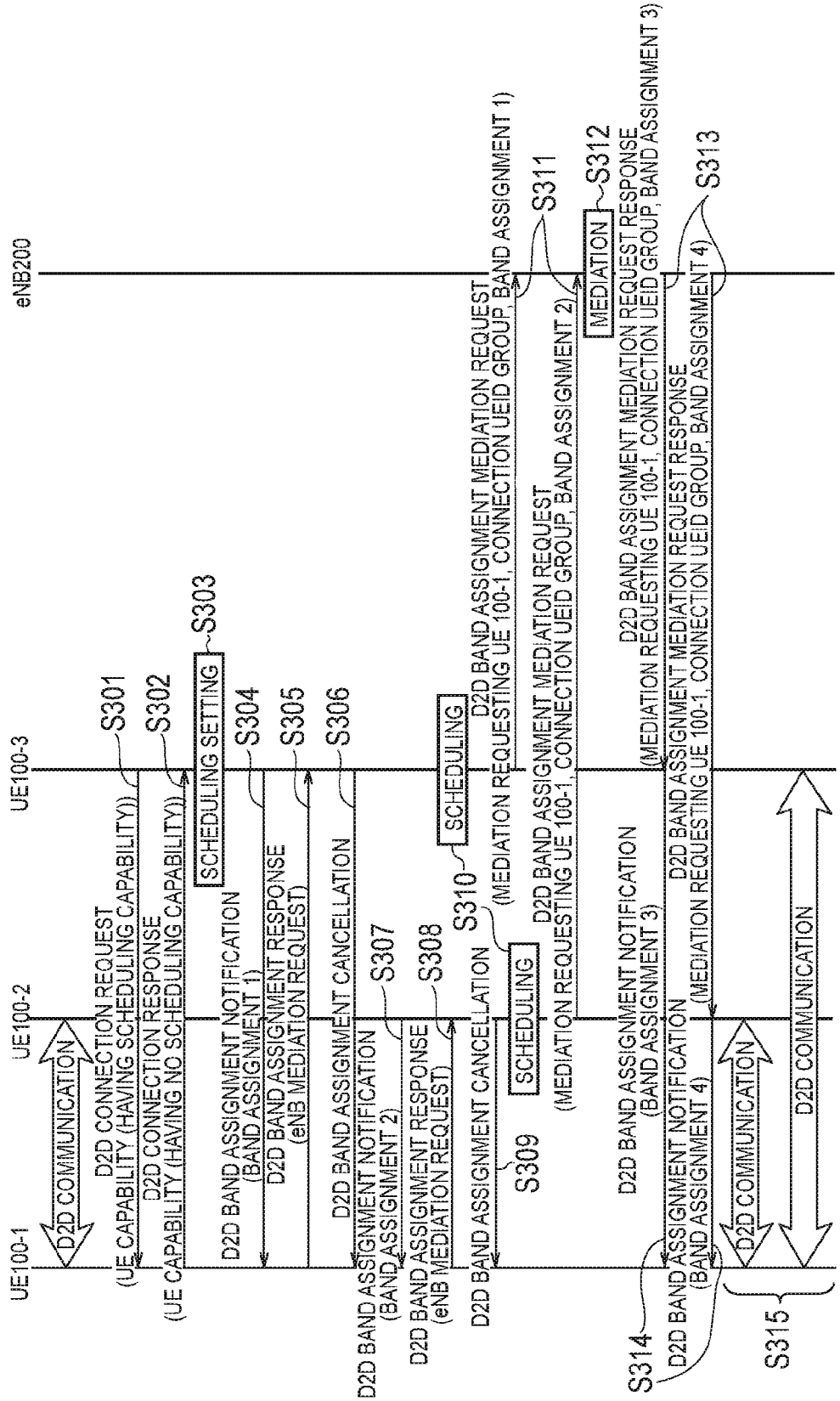
FIG. 9 is a sequence diagram illustrating an operation example of the mobile communication system according to a first modification of the present embodiment.

Schematic Operation of Mobile Communication System According to First Modification Next, by using FIG. 9, a schematic operation of a mobile communication system according to a first modification of the present embodiment will be described. FIG. 9 is a sequence diagram illustrating an operation example of the mobile communication system according to the first modification of the present embodiment.

It is noted that a description will be provided while focusing on a portion different from the above-described embodiment, and a description of a similar portion will be omitted, where necessary.

In the above-described embodiment, the UE 100-1 performing D2D communication individually with the plurality of UEs 100 (that is, the UE 100-1 which is a common communication partner for the UE 100-2, the UE 100-3, and the UE 100-4) performs the mediation; however, in the present modification, the eNB 200 performs the mediation.

As shown in FIG. 9, steps S301 to S304 correspond to steps S101 to S104 in the first embodiment.

In step S305, the UE 100-1 transmits, as the D2D band assignment response, a mediation request indicating a mediator of the radio resource, to the UE 100-3. In the present modification, as the D2D band assignment response, the UE 100-1 transmits the mediation request to request the eNB 200 to serve as a mediator of a radio resource (eNB mediation request), instead of the acceptance information and the rejection information.

In the present modification, a description will be given on the assumption that the UE 100-1 has selected the eNB 200 as the mediator.

For example, the UE 100-1 transmits the mediation request in a case where the UE 100-1 does not have a capability of mediating the radio resource. Further, even in a case where the UE 100-1 has a capability of mediating the radio resource, the UE 100-1 may transmit the mediation request, for example, in order to reduce the load caused by performing D2D communication with the plurality of UEs 100.

In step S306, the UE 100-3 transmits a D2D band assignment cancellation to the UE 100-1. The UE 100-1 receives the D2D band assignment cancellation.

The UE 100-3, that has received the mediation request, transmits the D2D band assignment cancellation in order to prevent the UE 100-1 from performing D2D communication by using the band assignment 1 that is assigned in step S304. The UE 100-1, that has received the D2D band assignment cancellation, performs control not to perform D2D communication by using the band assignment 1.

Step S307 corresponds to step S108 in the first embodiment.

In step S308, similar to step S305, the UE 100-1 transmits, to the UE 100-2, the eNB mediation request to request the eNB 200 to serve as the mediator of the radio resource, as the D2D band assignment response. The UE 100-2 receives the eNB mediation request.

In step S309, similar to step S306, the UE 100-2 transmits the D2D band assignment cancellation to the UE 100-1.

In step S310, each of the UE 100-2 and the UE 100-3 performs the scheduling for their own D2D communication.

It is noted that a process of step S310 may be omitted in a case where each of the UE 100-2 and the UE 100-3 transmit, to the eNB 200, the radio resource that is notified to the UE 100-1 in the D2D band assignment notification in next step S311.

In step S311, each of the UE 100-2 and UE 100-3 transmit a D2D band assignment mediation request to the eNB 200. The eNB 200 receives the D2D band assignment mediation requests from each of the UE 100-2 and the UE 100-3.

The D2D band assignment mediation request includes an identifier of the UE 100-1 from which the mediation is requested (mediation requesting UE 100-1), information indicating a group that is configured by the plurality of UEs 100 directly connecting with the UE 100-3 for D2D communication (connection UEID group), and the radio resource assigned by the UE 100-3 (the band assignment 1). Information indicating the connection UEID group, for example, is identifiers indicating each of the UE 100-1 and the UE 100-3. Further, in the present embodiment, the UE 100-2 notifies the band assignment 2 as the band assignment, and the UE 100-3 notifies the band assignment 1 as the band assignment. Here, each of the band assignment 1 and the band assignment 2 are the band assignment obtained by the scheduling in step S310.

In step S312, the eNB 200 performs the mediation of a radio resource.

In the present embodiment, a description will be given on the assumption that the band assignment 1 assigned by the UE 100-3 overlaps with the band assignment 2 assigned by the UE 100-2.

The eNB 200 performs the assignment of a new radio resource, instead of transmitting the rejection information. The eNB 200 assigns a band assignment 3 for D2D communication between the UE 100-1 and the UE 100-2, and assigns a band assignment 4 for D2D communication between the UE 100-1 and the UE 100-2. The band assignment 3 and the band assignment 4 do not overlap each other in the time direction and in the frequency direction.

In step S313, the eNB 200 transmits a response to the D2D band assignment mediation request (D2D band assignment mediation request response) to each of the UE 100-2 and the UE 100-3. Each of the UE 100-2 and the UE 100-3 receives the D2D band assignment mediation request response.

The D2D band assignment mediation request response includes the mediation requesting UE 100-1 included in the D2D band assignment mediation request, the connection UEID group, and the radio resource that the eNB 200 newly assigns in step S313 (band assignment). The D2D band assignment mediation request response to be transmitted to the UE 100-2 includes the band assignment 4, and the D2D band assignment mediation request response to be transmitted to the UE 100-2 includes the band assignment 3.

In step S314, the UE 100-2 transmits, to the UE 100-1, the D2D band assignment notification including the band assignment 4 that is included in the D2D band assignment mediation request response. Similarly, the UE 100-3 transmits, to the UE 100-1, the D2D band assignment notification including the band assignment 3 that is included in the D2D band assignment mediation request response. The UE 100-1 receives the D2D band assignment notification from each of the UE 100-2 and the UE 100-3.

Step S315 corresponds to step S111.

Figure 10:
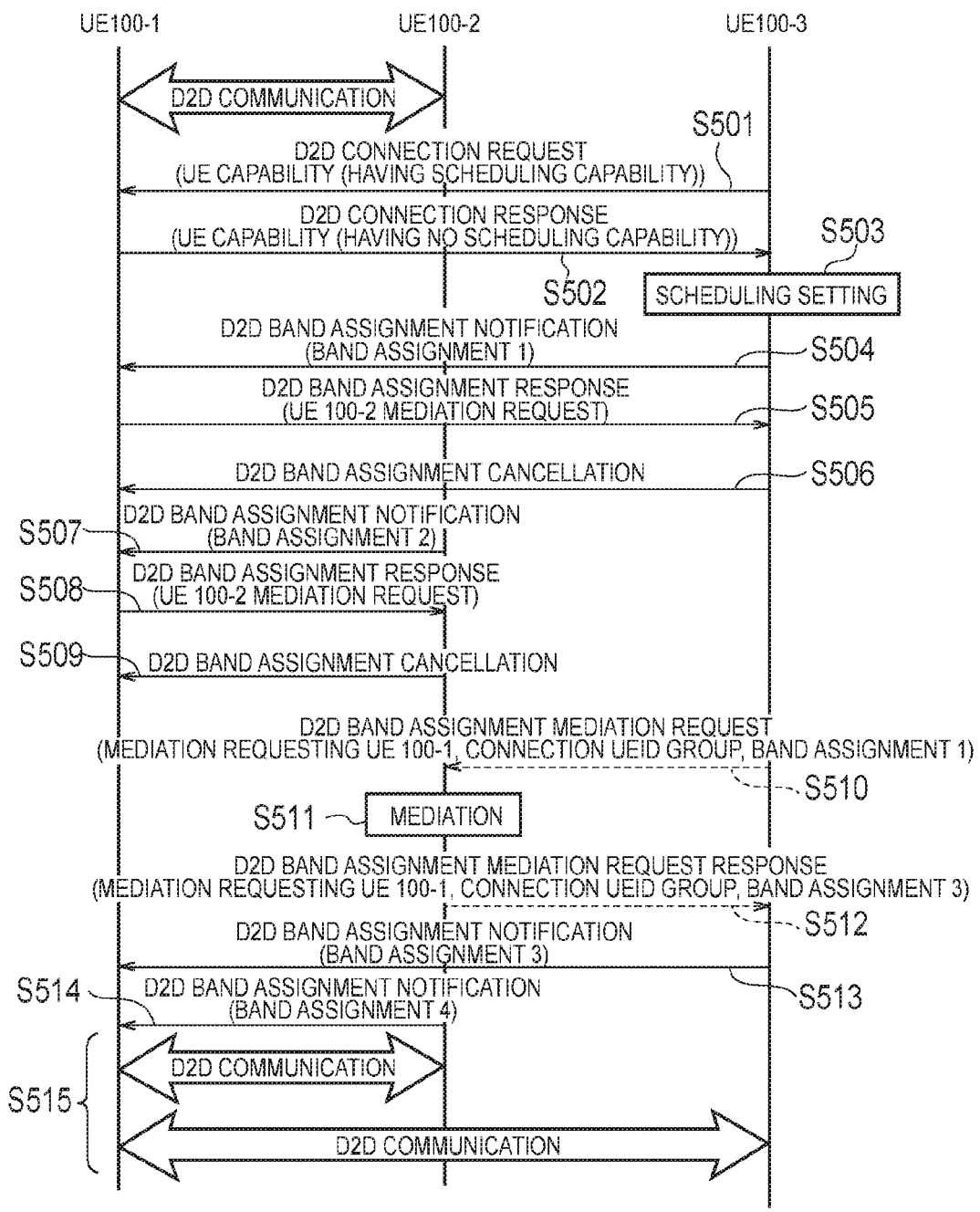
FIG. 10 is a sequence diagram illustrating an operation example of the mobile communication system according to a second modification of the present embodiment.

Schematic Operation of Mobile Communication System According to Second Modification Next, by using FIG. 10, a schematic operation of a mobile communication system according to a second modification of the present embodiment will be described. FIG. 10 is a sequence diagram illustrating an operation example of the mobile communication system according to the second modification of the present embodiment.

It is noted that a description will be provided while focusing on a portion different from the above-described embodiment, and a description of a similar portion will be omitted, where necessary.

In the above-described embodiment, the UE 100-1 performing D2D communication individually with the plurality of UEs 100 (that is, the UE 100-1 which is a common communication partner for the UE 100-2, the UE 100-3, and the UE 100-4) performs the mediation; however, in the present modification, the UE 100-2 which is not a common communication partner performs the mediation.

As shown in FIG. 10, steps S501 to S504 correspond to steps S101 to S104 in the first embodiment.

It is noted that in step S501, the D2D connection request may include information indicating that the UE 100-3 has a mediation capability to mediate the radio resource.

In step S505, the UE 100-1 transmits, to the UE 100-3, the response to the D2D band assignment notification (D2D band assignment response). In the present modification, as the D2D band assignment response, the UE 100-1 transmits the mediation request indicating the mediator of the radio resource, instead of the acceptance information and the consent information.

In the present modification, a description will be given on the assumption that the UE 100-1 has selected the UE 100-2 as a mediator.

The mediation request includes an identifier indicating the UE 100-2 as the mediator.

Step S506 and step S507 correspond to step S306 and step S307 in the first modification.

In step S508, similar to step S505, the UE 100-1 transmits, to the UE 100-2, the mediation request to request the UE 100-2 to serve as a mediator of the radio resource (UE 100-2 mediation request) as a response to the D2D band assignment notification. The UE 100-2 receives the mediation request.

Step S509 corresponds to step S309 in the first modification.

In step S510, the UE 100-3 notifies the UE 100-2 of the D2D band assignment mediation request to request mediation of the radio resource used in D2D communication. The UE 100-2 receives the D2D band assignment mediation request.

The D2D band assignment mediation request includes the mediation requesting UE 100-1, the connection UEID group, and the band assignment. In the present embodiment, the band assignment is the radio resource which is notified to the UE 100-1 in the D2D band assignment notification. It is noted that the UE 100-3 may include the band assignment that is obtained by newly performing the scheduling into the D2D band assignment mediation request.

It is noted that a connection for transmitting control data is not established between the UE 100-2 and the UE 100-3, therefore, the UE 100-3 notifies the UE 100-2 of the D2D band assignment mediation request in any of the following cases, for example.

(1) Case 1

Case 1 is a case where the UE 100-3 directly notifies the UE 100-2 of the D2D band assignment mediation request through the D2D communication.

In order to establish a control-use D2D connection for transmitting and receiving control data to and from the UE 100-2, the UE 100-3 notifies the eNB 200 of that effect. The UE 100-3 may notify the eNB 200 of the mediation request from the UE 100-1. The eNB 200 sets the control-use D2D connection between the UE 100-2 and the UE 100-3. After that, the eNB 200 notifies each of the UE 100-2 and the UE 100-3 of the band assignment for the control-use D2D connection. Each of the UE 100-2 and the UE 100-3 receives the band assignment that is notified from the eNB 200. The UE 100-3 directly notifies the UE 100-2 of the D2D band assignment mediation request through the D2D connection, by using the notified band assignment. In this case, under the control of the eNB 200, the D2D communication is performed between the UE 100-2 and the UE 100-3.

It is noted that the UE 100-3 (and/or the UE 100-2) may control the D2D communication instead of the eNB 200 controlling the D2D communication. Specifically, after the control-use D2D connection is set between the UE 100-2 and the UE 100-3, the eNB 200 may request a switching from the cellular communication to the D2D communication to each of the UE 100-2 and the UE 100-3, and may cut off the connection with the UE 100-2 and the connection with the UE 100-3. Under the control of the UE 100-3 (and/or the UE 100-2), the UE 100-3 may directly notify the UE 100-2 of the D2D band assignment mediation request.

Further, the UE 100-3 may establish the D2D connection with the UE 100-2 without performing the notification for establishing the control-use D2D connection, to the eNB 200. Specifically, the UE 100-3 transmits a discovery signal to discover the UE 100-2, and then, performs a negotiation to establish the control-use D2D communication with the UE 100-2 that has received the discovery signal. After that, the UE 100-3 directly notifies the UE 100-2 of the D2D band assignment mediation request.

(2) Case 2

Case 2 is a case where the UE 100-3 notifies the D2D band assignment mediation request via the eNB 200.

The UE 100-3 notifies the eNB 200 of the D2D band assignment mediation request. The eNB 200 transfers, to the UE 100-2 which is a mediator, the D2D band assignment mediation request by the identifier indicating the mediator. Therefore, the UE 100-2 and the UE 100-3 perform the connection for the control via the eNB 200.

(3) Case 3

Case 3 is a case where the UE 100-3 notifies the D2D band assignment mediation request via the UE 100-1.

The UE 100-3 transmits the D2D band assignment mediation request to the UE 100-1, and the UE 100-1 transfers the D2D band assignment mediation request to the UE 100-2.

It is noted that when the UE 100-1 transmits the mediation request to the UE 100-3 in step S505, the UE 100-1 may transmit, to the UE 100-2, the band assignment 3 from the UE 100-3 together with the mediation request.

In step S511, similar to step S312 in the first modification, the UE 100-2 that has received the D2D band assignment mediation request performs the mediation of the radio resource.

In the present modification, a description will be given on the assumption that the band assignment 1 assigned by the UE 100-3 overlaps with the band assignment 2 assigned by the UE 100-2, and the UE 100-2 assigns the band assignment 3 to the UE 100-1 and the UE 100-3 and the band assignment 4 to the UE 100-1 and the UE 100-2.

In step S512, the UE 100-2 notifies the UE 100-3 of the response to the D2D band assignment mediation request (D2D band assignment mediation request response) from the UE 100-3. The UE 100-3 receives the D2D band assignment mediation request response.

The D2D band assignment mediation request response includes the mediation requesting UE 100-1, the connection UEID group, and the band assignment 3 that is newly assigned in step S511.

It is noted that the D2D band assignment mediation request response from the UE 100-2 to the UE 100-3 may be notified in a way (case) similar to the above-described step S510, or may be notified in different way from step S510.

In step S513, the UE 100-3 transmits, to the UE 100-1, the D2D band assignment notification including the band assignment 3 included in the D2D band assignment mediation request response. The UE 100-1 receives the D2D band assignment notification.

In step S514, the UE 100-2 transmits, to the UE 100-1, the D2D band assignment notification including the band assignment 4 that is assigned by the UE 100-2 itself. The UE 100-1 receives the D2D band assignment notification.

Step S515 corresponds to step S111.

Conclusion of Embodiment

In the present embodiment, in a case where the transmission of the user data is not performed between each of the UE 100-2, the UE 100-3, (and the UE 100-4) through D2D communication, and in a case where each of the UE 100-2, the UE 100-3, (and the UE 100-4) assigns a resource for transmitting and receiving the user data through D2D communication, the UE 100-1 performs mediation of the band assignment such that the radio resource (band assignment) assigned to each of the UE 100-2, the UE 100-3, (and the UE 100-4) does not overlap each other. Thus, with the mediation of the UE 100-1, it is possible to prevent radio resources assigned by different UEs 100 not transmitting and receiving the user data each other from overlapping. As a result, it is possible to suppress the occurrence of the interference by performing the D2D communication by using the radio resource assigned by the different UEs 100.

Further, in the present embodiment, each of the UE 100-2, the UE 100-3, (and the UE 100-4) notifies the UE 100-1 of the D2D band assignment notification indicating the assigned radio resource. The UE 100-1 notifies the D2D band assignment response indicating to accept or reject performing the D2D communication by using the band assignment, on the basis of the notified D2D band assignment notification. Thus, each of the UE 100-2, the UE 100-3, (and the UE 100-4) that has received the notification of the D2D band assignment response is capable of determining whether or not it is possible to perform the D2D communication by using the radio resource assigned by each of the UEs themselves.

Further, in the second modification, each of the UE 100-2 and the UE 100-3, (and the UE 100-4) notifies the UE 100-3 of the band assignment. The UE 100-3 performs the assignment of a new radio resource for each of the UE 100-1, the UE 100-2, the UE 100-3, (and the UE 100-4), and the UE 100-3 notifies the band assignment indicating the new radio resource. Thus, it is possible to prevent a situation where performing the D2D communication by using the band assignment is rejected, and therefore the D2D communication is not allowed to be performed or the start of the D2D communication is delayed.

Further, in the first modification and the second modification, a communication apparatus other than the UE 100-1 performs the mediation. That is, a controller configured to perform the mediation is provided in the communication apparatus other than the UE 100-1. Each of the UE 100-2, the UE 100-3, (and the UE 100-4) notifies the UE 100-1 of the band assignment, and the UE 100-1 transmits, to each of the UE 100-2, the UE 100-3, (and the UE 100-4), the D2D band assignment response indicating that the UE 100-3 or the eNB 200 performs the mediation of the band assignment. Thus, even when the UE 100-1 does not perform the mediation, it is possible to prevent the band assignments from overlapping.

In the first modification, the controller configured to perform the mediation is provided in the eNB 200. Thus, as described above, it is possible to suppress an increase in the load of the UE 100-1. Further, when comparing with a case where a UE 100 other than the UE 100-1 performs the mediation, it is possible to suppress an increase in the load of each UE 100 since a new connection between another UE 100 performing the mediation and a UE 100 other than the other UE 100 not performing the mediation needs not to be established to transmit the band assignment.

In the second modification, the controller configured to perform the mediation is provided in the UE 100-2. Thus, when comparing with a case where the UE 100-1 performs the mediation of the band assignment, it is possible to suppress an increase in the load of the UE 100-1 that performs the D2D communication with a plurality of UEs 100. Further, when the UE 100-2 performs the mediation, it is possible to reduce power consumption since the D2D communication is performed with low transmission power when comparing with a case where the eNB 200 performs the mediation of the band assignment.

OTHER EMBODIMENTS

As described above, the present invention has been described with the embodiments. However, it should not be understood that those descriptions and drawings constituting a part of this disclosure limit this invention. From this disclosure, a variety of alternate embodiments, examples, and applicable techniques will become apparent to one skilled in the art.

For example, in the above-described embodiment, the UE 100-1, the UE 100-2, or the eNB 200 performs the mediation; however, this is not limiting. For example, the controller according to the present invention may be provided in an upper apparatus of the eNB 200 (for example, MME300) or a mediation apparatus (server) arranged on the network, that is, a network apparatus, and the upper apparatus of the eNB 200 or the mediation apparatus may perform the mediation. Further, for example, in the above-described embodiment, in a case where the UE 100-1 and the UE 100-2 perform a group communication through the D2D communication with a UE 100-5 which does not perform the scheduling, the UE 100-5 may perform the mediation. Thus, a UE 100 other than the UE 100-1 performing the D2D communication with the plurality of UEs 100 and other than each of the UEs 100 performing the scheduling performs the mediation, and thereby it is possible to distribute loads on each UE 100.

Further, in the above-described embodiment, in a case where the UE 100-1 does not have the scheduling capability, the UE 100-1 performs the mediation or makes the other communication apparatus perform the mediation; however, even in a case where the UE 100-1 has the scheduling capability, the UE 100-1 may perform the mediation or make the other communication apparatus perform the mediation. For example, in a case where a battery remaining amount is less than a predetermined threshold value or a process load exceeds a threshold, the UE 100-1 may perform the mediation or make the other communication apparatus perform the mediation.

Further, in the above-described embodiment, the UE 100-1 may accept a part of the band assignment, and may transmit information rejecting a part of the band assignment. For example, in a case where the band assignment 0 and the band assignment 1 partially overlap with the band assignment 0, the UE 100-1 may transmit acceptance information to accept a frequency band that does not overlap (a part of the frequency band) and rejection information to reject a frequency band that overlaps (remaining frequency band) together. Further, the UE 100-1 may transmit only acceptance information to accept a frequency band that does not overlap, without transmitting rejection information.

Further, in the above-described embodiment, the communication apparatus (including the UE 100-1) that performs mediation may perform the scheduling so that the communication apparatus preferentially assigns to a UE that notifies the UE 100-1 performing the mediation of the D2D band assignment notification earlier (that is, in the band assignment that is notified later, the radio resource, which overlaps with the band assignment that is notified earlier, is not accepted) and may perform the scheduling by taking into consideration each of the D2D group communication situation after receiving the D2D band assignment notification from each of the all D2D groups that performs D2D communication with the UE 100-1 individually.

Further, in the above-described embodiment, each of the UE 100-2 and the UE 100-3 transmits the D2D band assignment mediation request to the eNB 200; however, this is not limiting. For example, the UE 100-1 may collectively notify the eNB 200 of the D2D band assignment mediation request. Further, the UE 100-2 and the UE 100-3 may notify the eNB 200 of the D2D band assignment mediation requirement via an anchor UE 100 that performs communication with the eNB 200 and represents the plurality of UEs 100.

In the above-described embodiment, one example that the present invention is applied to the LTE system has been described; however, the present invention is not limited to apply to the LTE system and may also be applied to systems, other than the LTE system, as well as the LTE system.

In addition, the entire content of JP Patent Application No. 2013-144022 (filed on Jul. 9, 2013) is incorporated in the present specification by reference.

INDUSTRIAL APPLICABILITY

As described above, the mobile communication system, the user terminal, and the network apparatus according to the present invention are useful in a mobile communication field since it is possible to suppress occurrence of interference even though each of a plurality of other user terminals performs scheduling for assigning a radio resource to itself and to a user terminal when the user terminal performs D2D communication with each of the plurality of other user terminals individually.

The invention claimed is:
1. A mobile communication system comprising:
a first user terminal;
a second user terminal;
a third user terminal; and
a controller configured to control radio resources which are assigned to transmit user data through direct communication between terminals, wherein
the first user terminal performs the direct communication with the second user terminal,
the first user terminal performs the direct communication with the third user terminal,
the second user terminal and the third user terminal do not perform the direct communication with each other,
the first user terminal receives first information on radio resources assigned by the second user terminal to perform the direct communication between the first user terminal and the second user terminal,
the first user terminal receives second information on radio resources assigned by the third user terminal to perform the direct communication between the first user terminal and the third user terminal, and
the controller performs a mediation of assigned radio resources such that the radio resources assigned by the second user terminal and the radio resources assigned by the third user terminal do not overlap each other.
2. The mobile communication system according to claim 1, wherein the controller determines whether or not the radio resources assigned by the second user terminal and the radio resources assigned by the third user terminal overlap each other, and the controller notifies the second user terminal or the third user terminal of a rejection to perform the direct communication by using the assigned radio resources in response to determining that the radio resources assigned by the second user terminal and the radio resources assigned by the third user terminal overlap each other.

3. The mobile communication system according to claim 1, wherein the controller assigns a new radio resource to be used for the direct communication in response to determining that the radio resources assigned by the second user terminal and the radio resources assigned by the third user terminal overlap each other, and the controller transmits information on the assigned new resource to the second user terminal and the third user terminal, respectively.

4. The mobile communication system according to claim 1, wherein the controller is provided in a communication apparatus other than the first user terminal, and the first user terminal transmits, to the second user terminal and the third user terminal, information indicating that the communication apparatus performs the mediation of the assigned radio resources.

5. The mobile communication system according to claim 4, wherein the communication apparatus is a network apparatus included in a network, and the controller is provided in the network apparatus.

6. The mobile communication system according to claim 4, wherein the communication apparatus is the second user terminal, and the controller is provided in the second user terminal.

7. A first user terminal configured to perform direct communication between terminals, comprising:

a processor configured to:

perform the direct communication with a second user terminal;

perform the direct communication with a third user terminal which does not perform the direct communication with the second user terminal;

receive first information on radio resources assigned by the second user terminal to perform the direct communication between the first user terminal and the second user terminal;

receive second information on radio resources assigned by the third user terminal to perform the direct communication between the first user terminal and the third user terminal; and perform a mediation of assigned radio resources such that the radio resources assigned by the second user terminal and the radio resources assigned by the third user terminal do not overlap each other.

8. A network apparatus configured to control radio resources which are assigned to transmit user data through direct communication between terminal, comprising:

a processor configured to:

receive first information on radio resources assigned by a second user terminal to perform the direct communication between a first user terminal and the second user terminal;

receive second information on radio resources assigned by a third user terminal which does not perform the direct communication with the second user terminal to perform the direct communication between the first user terminal and the third user terminal; and perform a mediation of assigned radio resources such that the radio resources assigned by the second user terminal and the radio resources assigned by the third user terminal do not overlap each other.

9. A second user terminal configured to perform direct communication between terminals, comprising:

a processor configured to:

perform the direct communication with a first user terminal which performs the direct communication with a third user terminal which does not perform the direct communication with the second user terminal;

assign radio resources to perform the direct communication between the first user terminal and the second user terminal;

transmit first information on the radio resources to the first user terminal;

receive second information on radio resources assigned by the third user terminal to perform the direct communication between the first user terminal and the third user terminal; and perform a mediation of assigned radio resources such that the radio resources assigned by the second user terminal and the radio resources assigned by the third user terminal do not overlap each other.

\* \* \* \* \*